United States Patent [19]

Knight, deceased

[11] 4,165,255
[45] Aug. 21, 1979

[54] NUCLEAR FUEL RACK LATERAL SUPPORT AND PRELOAD DEVICE

[75] Inventor: Charles B. Knight, deceased, late of Gulf Breeze, Fla., by June S. Knight, personal representative

[73] Assignee: Westinghouse Electric Corp., Pittsburgh, Pa.

[21] Appl. No.: 789,912

[22] Filed: Apr. 22, 1977

[51] Int. Cl.² ............... G21C 19/20; G21C 19/00; B66F 3/22; B66F 3/00
[52] U.S. Cl. ........................... 176/30; 176/28; 254/122; 254/126
[58] Field of Search .............. 176/30, 27, 28, 29, 176/87; 254/122, 126, 84, 85, 50, 98, 102, DIG. 1

[56] References Cited

U.S. PATENT DOCUMENTS

| | | | |
|---|---|---|---|
| 2,758,816 | 8/1956 | Pickard | 254/126 |
| 3,026,258 | 3/1962 | Huet | 176/29 |
| 3,070,531 | 12/1962 | Huet | 176/28 |
| 3,188,276 | 6/1965 | Aranovitch | 176/28 |
| 3,263,430 | 8/1966 | Bryan | 254/126 |
| 3,333,553 | 8/1967 | Krokos | 254/126 |
| 4,042,828 | 8/1977 | Rubinstein | 176/30 |

FOREIGN PATENT DOCUMENTS 294665 3/1932 Italy .................... 254/DIG. 1

Primary Examiner—Verlin R. Pendegrass
Assistant Examiner—Donald P. Walsh
Attorney, Agent, or Firm—Edward L. Levine; Z. L. Dermer

[57] ABSTRACT

A lateral support device for a nuclear fuel rack vertically positioned within a walled enclosure which provides a preload to maintain effective support. The device includes a scissors-jack which is mounted so that the drive screw is vertical. Upon rotation of the drive screw the jack expands horizontally, seating a load pad against a vertical wall. The load pad is affixed to the jack by an arm having a stack of spring washers which compress between the pad and the jack, thereby applying a selected preload.

6 Claims, 6 Drawing Figures

NUCLEAR FUEL RACK LATERAL SUPPORT AND PRELOAD DEVICE

BACKGROUND OF THE INVENTION

1. Field of the Invention

This invention relates to nuclear fuel storage racks and more particularly to a lateral support and preload device for absorbing relative motion and maintaining seismic support between the racks and their containing enclosure.

2. Description of the Prior Art

Nuclear power generating plants are typically fueled by elongated fuel assemblies, such as those including a bundle of nuclear fuel rods. Subsequent to utilization of the fuel assemblies in a nuclear core they are stored within fuel racks positioned within an enclosure such as a spent fuel pit.

A typical spent fuel pit includes leak-tight walls and a floor made of concrete and other support materials lined with stainless steel. The fuel racks include a rectangular closely spaced array of cells, each cell sized to receive a fuel assembly. Because the assemblies have been irradiated they must be shielded, and water is typically utilized for this purpose. The assemblies are therefore maintained submerged within water within the pit.

In the prior art the fuel racks have been supported in several manners. Typically, adjacent racks are rigidly affixed to one another. In many installations, the racks are further bolted to the pit floor, without lateral support to the fuel pit walls. In other installations, the affixed racks sit on adaptor plates on the pit floor, and are laterally supported through rigid supports between the peripheral racks and the pit walls. Such support arrangements, however, do not provide an ideal response under assumed large seismic accident conditions.

The former, or purely cantilever type support, could result in excessive rack deflection under seismic loading, damaging the contained assemblies. Depending upon the spacing of the rack with respect to the fuel pit walls, excessive deflections could also result in undesirable rack and wall impact. The latter arrangement can also result in excessive deflections, unless very large lateral supports or a large number of lateral supports are utilized along the rack height. Such supports are undesirable where lack of space within the pit is a significant factor, particularly in those installations where back-fit of additional storage capacity or support is contemplated.

Most importantly, however, the seismic response of these lateral supports can be detrimentally lessened over a period of time as a result of relative motion of the fuel pit walls and the racks. This motion can occur, for example, as a result of thermal expansions and contractions of the structures. Such motion can relax the lateral support and can cause spatial gaps to form between the supports and the racks or walls. These gaps could cause excessive impacts under accident conditions. If the supports are rigidly affixed to both the peripheral racks and the walls, the relative motion can produce undesirable stresses on the structures.

Some additional lateral supports have been proposed which overcome these deficiencies through use of preload devices which, however, are to be positioned through an arclike motion between the racks and the walls. Such motion, however, makes the preload difficult to adjust and the devices difficult to be properly and accurately positioned. They also require a significant amount of space between the racks and the walls in order to accommodate the arc motion. And, in addition to their relatively high cost, the arc motion devices are difficult to properly seat because of the high frictional forces and slipping among contact surfaces that installation of such devices provides.

It therefore will be recognized that a lateral support system which provides proper lateral support in response to a seismic occurrence which also provides a sufficient mechanism, such as a preload to accommodate relative motion between the racks and the pit walls over a period of time, is desirable. Further, because the racks remain under water, it is desirable to provide such a system that can be remotely positioned and maintained. It is also desirable that such systems be compact, easily installed, relatively inexpensive, and independent of slippage among contact surfaces.

SUMMARY OF THE INVENTION

This invention provides a lateral support and preload device for nuclear fuel racks which also provides sufficient preload to accommodate relative motion between the racks and their containing enclosure. The device is compact, easily installed, relatively inexpensive to manufacture, and can also be remotely operated and maintained.

The device includes one or more load pads with a flat surface which can easily be positioned against a vertical surface, such as the wall of fuel pit or the side of a fuel rack. The pads can be mounted on an arm in a manner that allows the flat surface to be self-aligning with the wall upon horizontal motion of the arm. The arm is also provided with a shock absorber or spring which allows a predetermined preload to be applied to the pad abutting against the generally vertical surface. The arm is also affixed to apparatus which imparts horizontal motion in response to an applied force.

In a preferred embodiment this horizontally moving apparatus is a scissors-jack which expands horizontally upon turning of a vertical drive screw. The drive screw can easily be turned by a remotely supported elongated adjustment rod or wrench which engages the drive screw.

The support and preload device can be mounted either to the fuel pit wall or, preferably, to the spent fuel rack. To utilize the device the adjustment wrench is engaged with the head of the drive screw. By turning the wrench, automatically or manually, the scissors-jack apparatus expands horizontally, which horizontally moves the arm. With continuation of the turning the flat surface of the pad contacts the wall and aligns with the wall. Continued application of the turning force up to a selected torque value will preload the shock absorber so as to maintain, over a period of time, contact between the pad and the wall. It thus provides necessary lateral support without the potential of formation of a spatial gap, so as to properly respond in the event of seismic accelerations.

BRIEF DESCRIPTION OF THE DRAWINGS

The advantages, nature, and additional features of the invention will become more apparent from the following description read in connection with the accompanying drawings in which.

DESCRIPTION OF THE PREFERRED EMBODIMENTS

Figure 1:
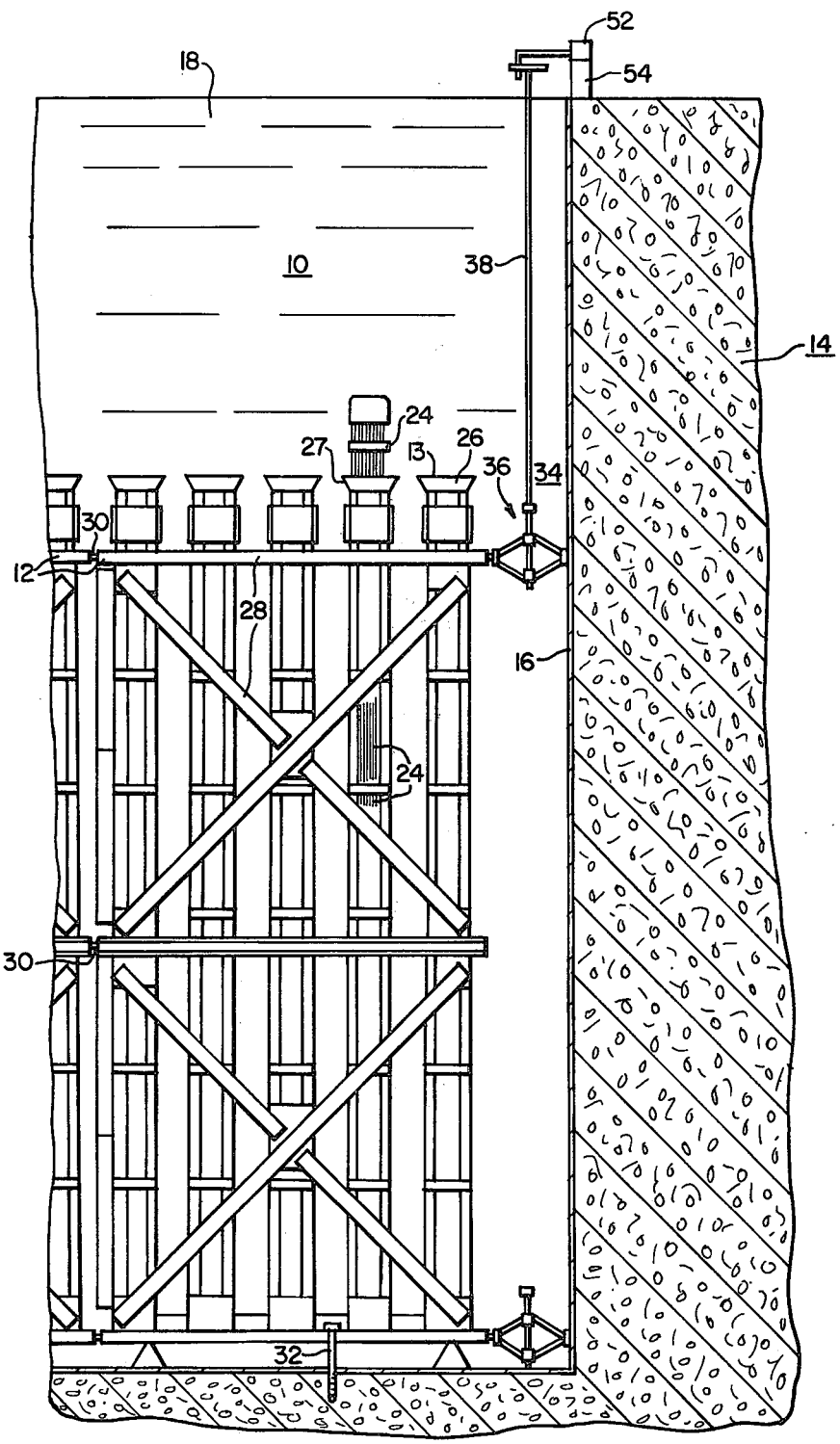
FIG. 1 is a schematic, in elevation, of spent fuel racks positioned within a spent fuel pit.

Referring now to FIG. 1 there is shown a spent fuel pit 10 containing a plurality of spent fuel racks 12. The pit is a sealed enclosure, typically rectangular, comprised of supporting concrete 14 and a sealed metallic liner 16. Prior to placing spent fuel in the pit 10 it is filled with a shielding medium, such as water 18 containing boric acid or other neutron poison.

Each fuel rack 12 includes a plurality of vertically oriented and closely spaced cells 13 each of which is sized to receive a fuel assembly 24. Each cell 13 can also be provided with a metallic can 26 or liner to receive and shield the assemblies 24 from one another. Each of the racks 12 shown include twenty-five cells 13 in a five-by-five rectangular array, although any array can be utilized. Each cell 13 can be fabricated from four structural stainless steel angles, one for each corner, with a plurality of support plates or beams affixed to the angles at selected elevations to form the basic cell for fuel assembly storage. An X-shaped structure can be affixed to the bottom of each cell at its corners, to provide a bottom stop for a fuel assembly which allows fluid circulation. The metallic liner 26 can comprise merely a square funnel 27 affixed at the top of each cell to guide a fuel assembly into its storage position, or can further extend the length of the cell.

The fuel racks 12, additionally comprised of a plurality of metallic beams 28 joining the cells, are closely positioned laterally and affixed to one another through mechanical connectors 30. They can also be affixed to the floor of the pit by means such as bolts 32. Connectors 30 are rigid so that in the event of seismic loadings the racks respond essentially as a single mass. This mass is restrained about the periphery of the outermost racks by a lateral support and preload system 34.

Figure 2:
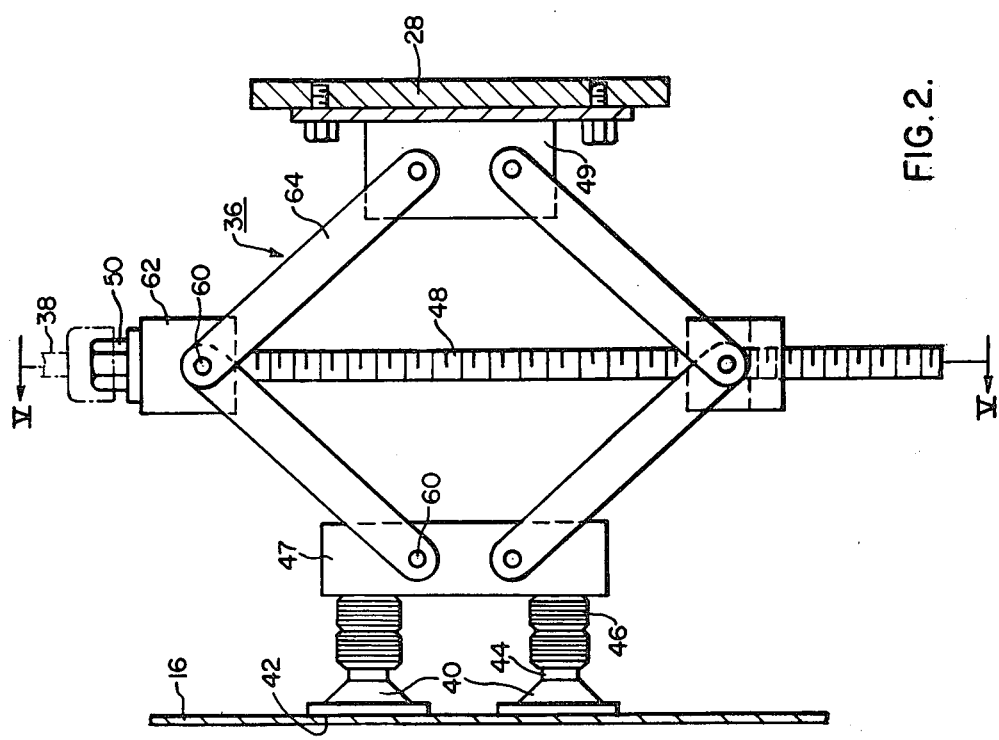
FIG. 2 is a schematic, in elevation, of a lateral support and preload device in accordance with this invention.

The system 34 includes a support and preload device 36 and means for adjusting the device 36 such as an adjustment wrench 38. Additional detail of an embodiment of the device 36 is shown in FIG. 2. The device includes a load pad 40 having a relatively flat surface 42. Preferably two pads are utilized for each device 36 to further ensure a proper seating against a substantially vertical surface such as the pit wall or the side of a rack. Each pad 40 is mounted to a bar or arm 44. Cooperatively associated with the arm is a flexible shock absorber such as a stack of spring washers 46. The washers 46 are utilized to apply a preload to the pad 40 after it has initially seated against the pit wall.

Figure 3:
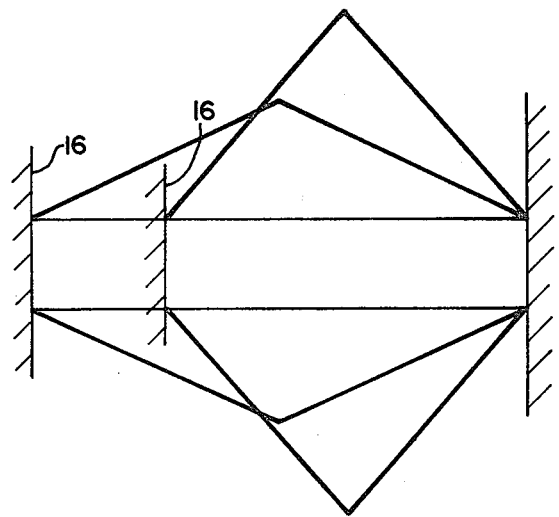
FIG. 3 is a schematic illustrating the kinematic motion of the device of FIG. 2.

The arm 44 is affixed to the support and preload device 36 which horizontally moves the arm in response to an applied force. The device 36 shown is a scissors-jack type which moves plate 47 laterally upon rotation of threaded vertical drive screw 48. Typically scissors-jacks are utilized to vertically raise or lower a weight. As shown, the device is rotated ninety degrees from that typical orientation when utilized for laterally supporting and preloading a fuel rack. The drive screw 48 is provided with structure, such as an hexagonal head 50, that is easily adaptable to a load applying means such as the adjustment wrench 38. The wrench 38 can be turned manually or by an automatic device 52 (FIG. 1) as well known in the art. A sensing mechanism 54 can also be utilized to apply a predetermined preload to the device 36. The kinematic motion of the positioned scissors-jack device is shown in FIG. 3, which illustrates two possible positions. As readily apparent, a single device 36 is adaptable to a plurality of available spatial areas.

The basic mode of operation of the device 36 of FIG. 2 is the same as a typical scissors-jack as used for lifting. In the device 36, the drive screw 48 is in a vertical position and, when rotated, lengthens or shortens the vertical diagonal of the parallelogram type shape formed by the linkage arms or side bars 64. As the motion of the arm 44 and load pad 40 is horizontal, there is no slippage between the load pad surface and the wall it contacts, and no friction forces to overcome.

It will be apparent that in addition to the scissors-jack mechanism, many alternative screw jacks and other structures can be utilized which provide horizontal motion. It is important, however, that the motion be horizontal in order to ensure proper seating of the load pads 40. The horizontal motion also minimizes the amount of space necessary for proper positioning.

It will also be recognized that the wall of the pit liner 16 and the sides of the racks 12 may not be directly vertical. To accommodate for such misalignment it is therefore desirable to movably mount the pad 40 to the arm 44 so as to allow some articulation between the two components.

Figure 4:
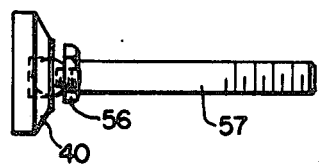
FIG. 4 is a view, in elevation, of a porton of an embodiment of this invention.

FIG. 4 shows a spherical mounting 56 which ensures that the flat surface 42 of the load pad 40 will be self-aligning with the pit 10 wall or rack 12 upon horizontal motion of the arm 44. Also shown is an extension 57 which abuts against the pad 40 and the spring stack, which stack also abuts against the plate 47.

Figure 5:
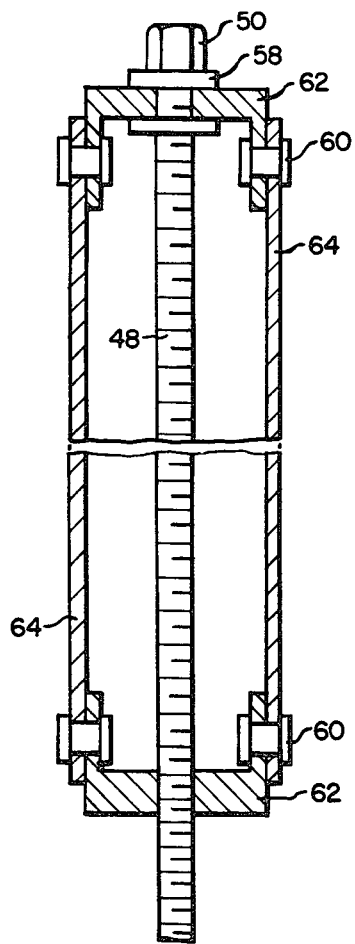
FIG. 5 is a sectional view, in elevation, taken at V—V of FIG. 2.

FIG. 5 shows additional detail of the support and preload device 36. The drive screw 48 is threaded along its length to provide maximum available lateral motion of the device. Thrust washers 58 are pinned to the drive screw 48, and pins 60 can be utilized to affix upper and lower supports 62 to side bars 64 so as to allow rotation between the supports 62 and bars 64 upon turning of the drive screw 48. Although four side bars 64 can be seen in FIG. 2, eight are utilized and connected by pins 60 in the manner shown in FIGS. 2 and 5. Side bars 64 are also pin connected to support 48 which can be bolted or otherwise attached to, for example, a rack metallic beam 28.

Figure 6:
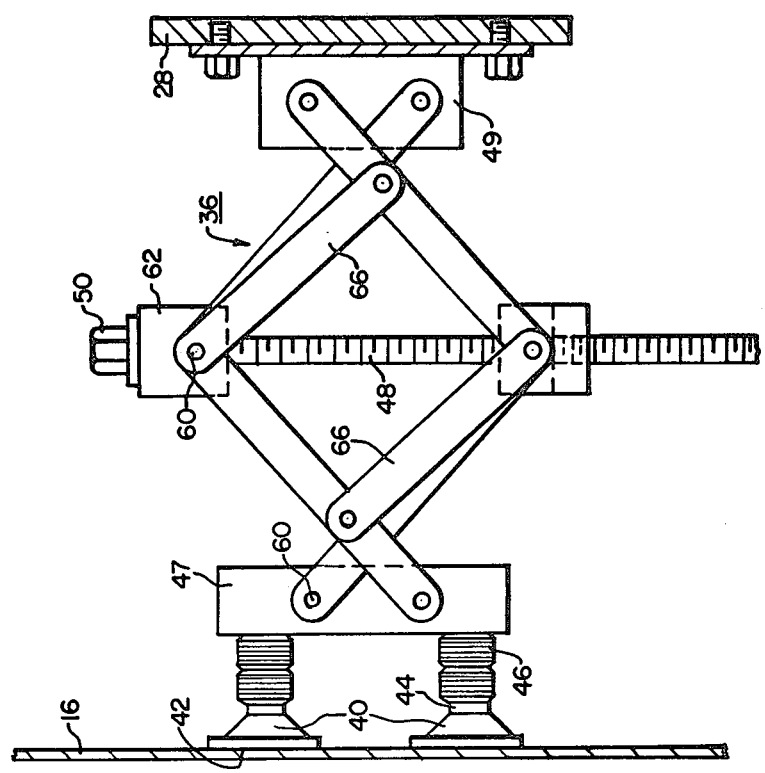
FIG. 6 is a schematic, in elevation of another embodiment of a lateral support and preload device in accordance with this invention.

FIG. 6 shows another embodiment of a support and preload device 36 which is more compact in operation than that shown in FIG. 2. It can beneficially be utilized in those areas where limited space is an important factor. It is similar to the device of FIG. 2 with the addition of partial side bars 66 connected in the manner shown. The amount of horizontal extension of the device 36, and the supportive/restraining force applied can also be varied as desired by varying the pitch of the drive screw 48 thread, the length and connection points of the side bars 64, 66, and/or the flexibility of the shock absorber 46.

The relative ease with which the inventive device can be installed, maintained, and adjusted will also be apparent. The device 36 can be simply manufactured and assembled, and, in new nuclear facilities, readily affixed to fuel racks or fuel pit walls prior to installation of the racks within a pit. It can also be retro-fitted and properly positioned in existing spent fuel storage areas easier than prior art lateral support structures. The device and attaching structures can be made of non-corrosive materials, such as stainless steel, and, because of its simple mechanical structures, remain operable while under water and subject to irradiation for extended periods. The adjustment wrench can easily be engaged with the drive screw from above the water level, and, through application of a relatively small force, be turned so as to properly position and preload the device. Periodic testing and setting of the preload can easily be performed, if desired.

It will be apparent that many modifications and additions are possible in view of the above teachings. It therefore is to be understood that within the scope of the appended claims, the invention may be practiced other than as specifically described.

I claim:

1. A lateral support and preload device for a nuclear fuel rack affixed within an enclosure having a vertical wall, said device comprising:
   a. a load pad;
   b. means for moving said pad predominantly horizontally and into contact with said vertical wall in response to an applied force;
   c. shock absorbing means for applying a preload to said pad subsequent to contact of said pad with said vertical wall in response to a further applied force, said shock absorbing means being of a material free from substantial degradation in the nuclear fuel rack environment; and
   d. means for mounting said horizontal moving means to said rack.

2. A lateral support and preload device for a nuclear fuel rack disposed within a vertically walled enclosure, said device comprising:
   a. a load pad having a flat support surface;
   b. an arm;
   c. means for movably mounting said pad to said arm such that said flat support surface is self-aligning with said wall upon horizontal motion of said arm;
   d. means for moving said arm substantially horizontally in response to an applied force; and
   e. a metallic shock absorber cooperatively associated with said arm for applying a preload to said pad in response to said applied force.

3. A nuclear fuel storage rack disposed within a vertically walled enclosure comprising a vertical side, a lateral support and preload device affixed to react against said side having a load pad having a support surface, an arm, means for movably mounting said pad to said arm such that said flat support surface is self-aligning with said vertical side upon horizontal motion of said arm; means for moving said arm predominantly horizontally in response to an applied force; and a shock absorber cooperatively associated with said arm for applying a preload to said pad in response to said applied force such that said preload reacts between said wall and said vertical side, said shock absorber including a plurality of spring washers.

4. The lateral support and preload device of claim 2 wherein said means for moving said arm comprises a scissors-jack device having a vertical drive screw.

5. A nuclear fuel storage rack assembly positioned within an enclosure having a vertical wall comprising:
   a. a plurality of vertically oriented rectangular storage cells each sized to removably receive a fuel assembly through an open top;
   b. means for joining said cells into a rectangular array including a steel beam having a vertical surface parallel to said walls; and
   c. a lateral support and preload device mounted to said beam including:
      (i) a load pad having a contact surface;
      (ii) means for moving said contact surface into contact with said wall in response to an applied force without substituting slippage between said pad and wall; and
      (iii) flexible means for applying a predetermined preload to said pad subsequent to contact of said pad contact surface and said wall in response to a further applied force.

6. A nuclear fuel storage rack assembly disposed within an enclosure having a vertical wall comprising:
   a. a plurality of vertically oriented storage cells each sized to removably receive a fuel assembly through an open top;
   b. means for joining said cells into a rectangular array including a peripheral side member having a vertical surface; and
   c. a lateral support and preload device mounted to react against said side member including:
      (i) a load pad having a contact surface;
      (ii) means for moving said pad such that substantially said entire seating surface positively contacts said wall with minimal frictional restraint between said surface and wall upon said moving; and
      (iii) means for applying a predetermined preload to said pad subsequent to said positive contact whereby said preload reacts against said wall and said side member.

* * * * *